United States Patent [19]

Kitamura

[11] 4,138,938
[45] Feb. 13, 1979

[54] APPARATUS FOR PRODUCING THREE-DIMENSIONALLY FORMED CRACKERS

[76] Inventor: Shuji Kitamura, 6-78, Yamamoto-cho minami, Yao-City, Osaka Prefecture, Japan

[21] Appl. No.: 812,332

[22] Filed: Jul. 1, 1977

[51] Int. Cl.² ................... A21B 1/46; A21C 15/00
[52] U.S. Cl. ........................... 99/353; 99/355;
99/373; 99/374; 425/112; 425/500
[58] Field of Search ............... 425/112, 500, 383, 334,
425/520, 518, 511, 515; 99/450.1, 450.4, 450.6,
353, 355, 373, 374

[56] References Cited

U.S. PATENT DOCUMENTS

| 3,265,016 | 8/1966 | Cheung | 425/112 X |
| 3,343,504 | 9/1967 | Beik | 99/450.4 |
| 3,348,503 | 10/1967 | Beik et al. | 99/450.4 |
| 3,605,642 | 9/1971 | Brown | 425/500 X |
| 3,894,829 | 7/1975 | Brunner et al. | 425/383 |
| 4,012,184 | 3/1977 | Ma | 425/112 |

Primary Examiner—William R. Briggs
Attorney, Agent, or Firm—Wenderoth, Lind & Ponack

[57] ABSTRACT

A method of forming a soft plate-like baked piece into a three-dimensional cracker and an apparatus therefor. A plate-like cracker is placed immediately after baking onto two spaced, substantially parallel to each other plates and formed into a three-dimensional shape by two claws movable along a specified path.

4 Claims, 8 Drawing Figures

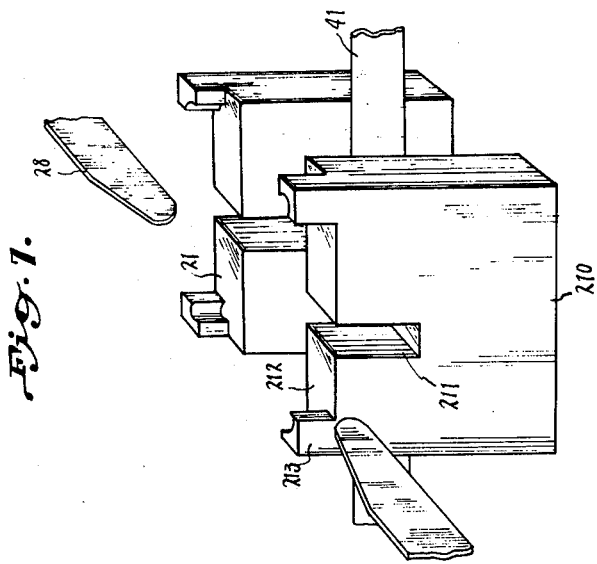
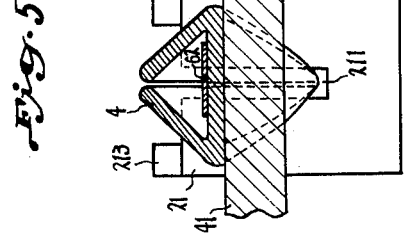
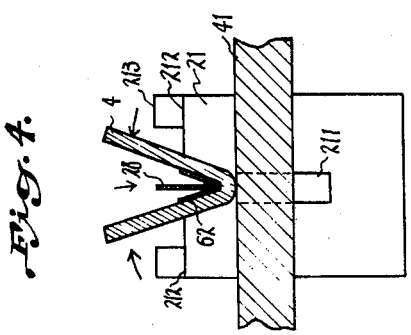
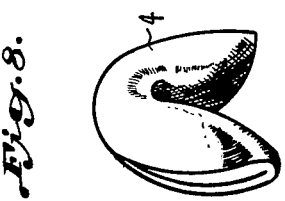
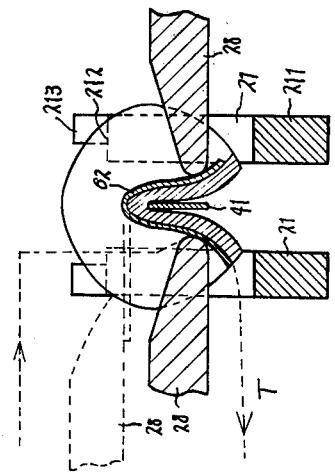

APPARATUS FOR PRODUCING THREE-DIMENSIONALLY FORMED CRACKERS

BACKGROUND OF THE INVENTION

With conventional methods and apparatus for mechanically forming three-dimensional crackers from plate-like pieces, the product obtained is limited to pieces of simple shape such as a cylindrical piece and a piece folded in two into a flat shape. In fact, no mechanical method or apparatus is known for producing three-dimensionally formed crackers having a central hollow portion from plate-like baked pieces.

This invention provides a mechanical process for producing three-dimensionally formed crackers from plate-shaped baked pieces and an apparatus therefor.

This invention further provides a mechanical process for forming plate-like baked pieces into three-dimensionally formed crackers having a fortune-telling, divinatory or like printed article enclosed in the central hollow portion of each cracker and an apparatus therefor.

SUMMARY OF THE INVENTION

A first object of this invention to provide a process for forming plate-like baked pieces into three-dimensionally formed crackers having a central hollow portion.

A second object of this invention is to provide an apparatus for forming plate-like baked pieces into three-dimensionally formed crackers having a cenral hollow portion.

A third object of this invention is to provide a process for forming plate-like baked pieces into three-diemnsionally formed crackers with a fortune-telling, divinatory or like printed article enclosed in a central hollow portion of the cracker.

A fourth object of this invention is to provide an apparatus for forming plate-like baked pieces into three-dimensionally formed crackers with a fortune-telling, divinatory or like printed article enclosed in a central hollow portion of the cracker.

To fulfill the first object, the present invention provides a process comprising the steps of folding a soft plate-like cracker in two immediately after baking, contacting a plate with a substantial midportion of the resulting fold at right angles to the fold, and forcing the opposite ends of the fold in a direction opposite to the folding direction.

To fulfill the second object, this invention provides an apparatus for producing three-dimensionally formed crackers comprising two forming plates spaced apart by a predetermined distance and parallel to each other, each of the forming plates having at its upper end a top portion for placing a cracker thereon. Projections are formed at the opposite ends of the top portion for positioning the cracker and a cutout extends downward from substantially a midportion of the top portion. A bulging plate is disposed substantially midway between the two forming plates, is parallel thereto, and has an upper edge positioned at a higher level than the lower end of the cutout of each of the forming plates, two forming claws are disposed on the opposite outer sides of the two forming plates and are positioned at right angles to the forming plates, each of the forming claws being movable along a path extending toward and over the top portion of the forming plate immediately adjacent thereto, and further extends downward along the cutout of the adjacent forming plate past the upper edge of the bulging plate and thereafter extending away from the forming plate.

To fulfill the third object, this invention provides a process comprising the foregoing steps wherein the plate-like cracker is folded with a fortune telling, divinatory or like printed article placed thereon in the folding step.

To fulfill the fourth object, this invention provides an apparatus comprising the foregoing components and further comprising a printed article transfer unit for transferring a fortune-telling, divinatory or like printed article onto a substantially central portion of the cracker on the forming plates.

BRIEF DESCRIPTION OF THE DRAWINGS

FIG. 4 is a view in section taken along the line 4—4 in FIG. 3 and showing a cracker obtained by the first half of a forming operation;

FIG. 5 is a sectional view similar to FIG. 4 and showing the cracker finally obtained by the forming operation;

FIG. 6 is a view showing a path of movement of a forming claw 28;

FIG. 7 is a perspective view of mold 21; and

FIG. 8 is a perspecitve view showing the three-dimensionally formed cracker.

DETAILED DESCRIPTION OF THE PREFERRED EMBODIMENTS

The present invention will be described below with reference to the following embodiments.

The first embodiment comprises a cracker baking unit A, a cracker transfer unit B, a suction disk transfer unit C, a mold conveying unit D, a forming unit E and a sequence control unit F.

Crackers baked by the baking unit A are immediately passed through the cracker transfer unit B, the suction disk transfer unit C, the forming unit E and the mold conveying unit D in the order mentioned and are thereby three-dimensionally formed. To ensure an efficient operation, the crackers are advanced in two rows. The following description will be given with respect to one row.

(1) Cracker Baking unit A

Figure 1:
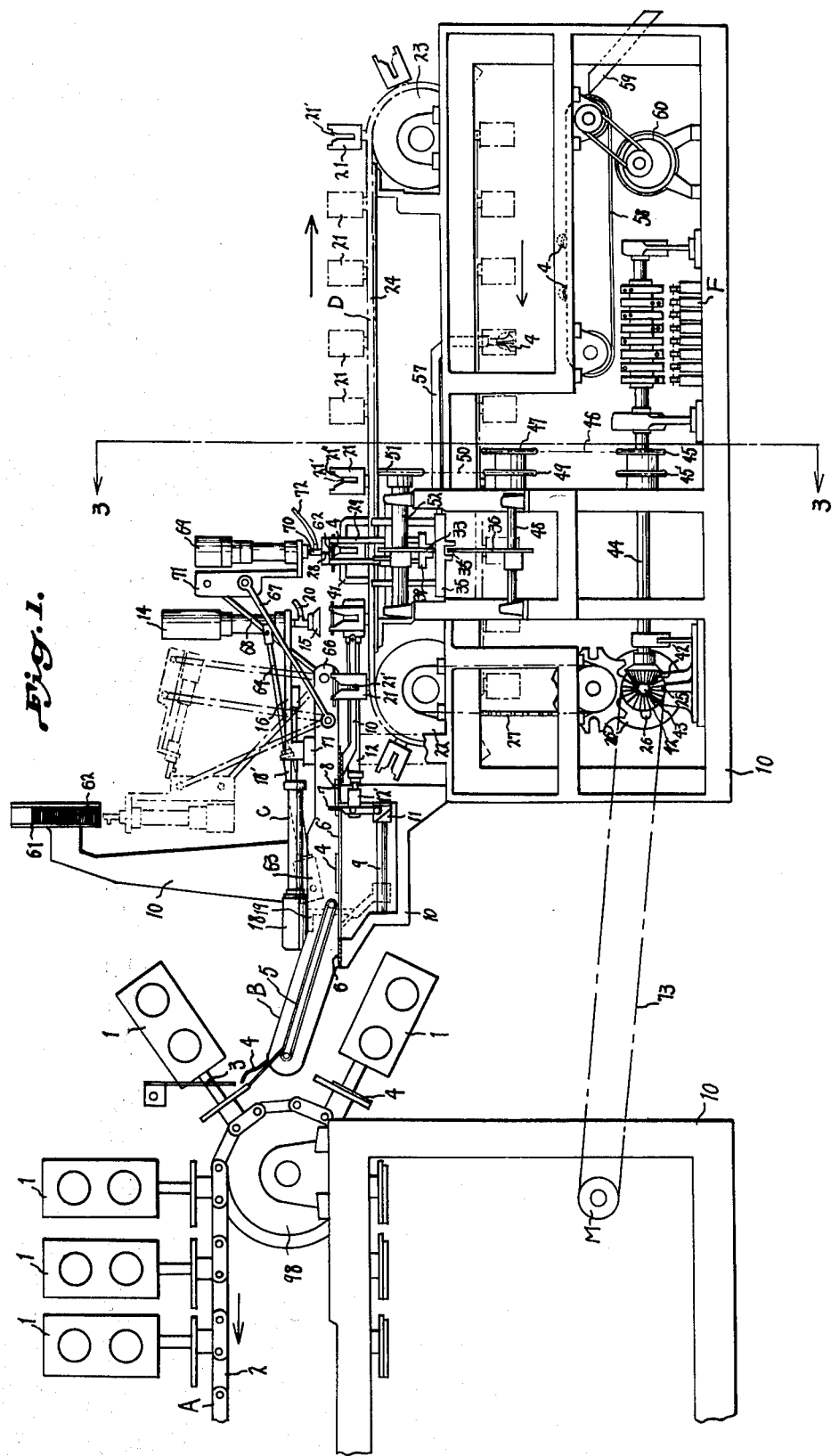
FIG. 1 is a side elevation showing an apparatus embodying the present invention for producing three-dimensionally formed crackers.
Figure 2:
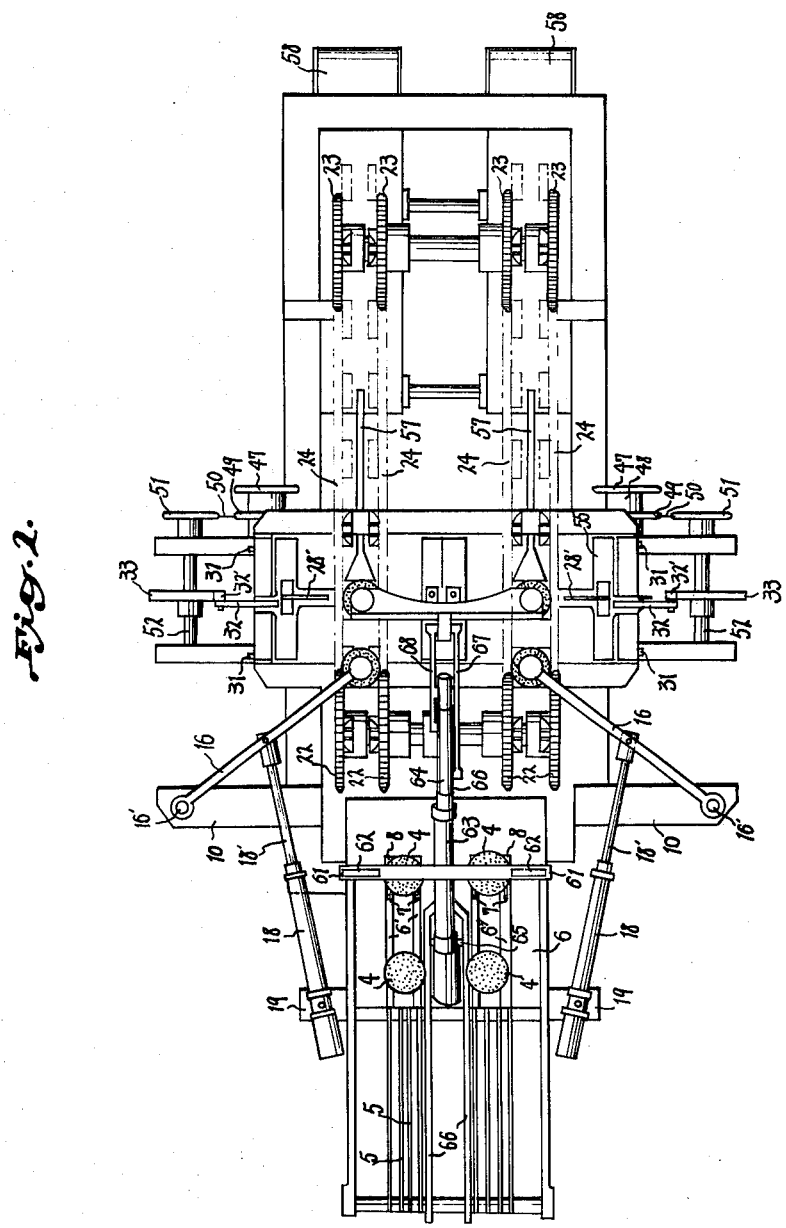
FIG. 2 is a plan view showing the apparatus.

With reference to FIGS. 1 and 2, the cracker baking unit A includes openable and closable baking plates 1 each comprising an upper member and a lower member for baking plate-like crackers. The baking plates 1 are mounted on an endless chain 2 at a regular spacing. The endless chain 2 is driven in an endless fashion by a sprocket wheel 98 mounted on the main body 10 of the apparatus to circulate the baking plates 1. During the circulating travel, the baking plates 1 are automatically opened and closed, are coated with oil, receive the material, are heated for baking and turned upside down. At an intermediate portion of path of travel of the baking plates 1 where they are turned upward from below, a scraper 3 is pivotably mounted on the main body 10 of the apparatus. The scraper 3 scrapes off soft crackers from the lower member of each opened baking plate 1 immediately after baking, permitting the crackers to fall onto a belt conveyor 5.

(2) Cracker transfer unit B

With reference to FIGS. 1 and 2, the belt conveyor 5 positioned below the scraper 3 conveys the crackers 4 released by the scraper 3. The belt conveyor 5 is associated with a cracker transfer table 6. A feeding claw 7 is disposed in the path of travel of the crackers sent forward by the conveyor 5. The feeding claw 7, pivotably mounted at its lower end on a sliding block 11, is pivotally movable clockwise to its vertical position and counterclockwise to its horizontal position. The sliding block 11 is slidably mounted on a guide rod 9 mounted on the main body 10 and positioned below the cracker transfer table 6. The midportion of the feeding claw 7 is pivotably attached to the rod 12' of a cylinder 12 mounted on the main body 10 for moving the feeding claw 7. Since the feeding claw 7 is pivotably mounted on the sliding block 11 as stated above, the cylinder rod 12', when driven rightward in FIG. 1, brings the feeding claw 7 to its upright position with its top end projecting upward through slits 6' formed in the transfer table 6, causing the claw 7 to advance the cracker 4 on the table 6 from the lower end of the conveyor 5 to a positioning member 8. When the cylinder rod 12' is forced out leftward in FIG. 1, the feeding claw 7 is titled and returned leftward below the transfer table 6 from the positioning member 8 to a position indicated in broken line in FIG. 1 at the lower end of the conveyor 5.

(3) Suction disk transfer unit C

The cracker 4 conveyed to the positioning member 8 is then sucked by a suction disk 15 which is vertically movable by a disk carrier cylinder 14. The cylinder 14 is provided with an arm 16 pivoted to the main body 10 by a pin 16' and horizontally movable. Pivoted to the midportion of the arm 16 is the rod 18' of a cylinder 18 turnably mounted at its base portion to the main body 10. The cylinder 18 operates to turn the arm 16 horizontally about the pin 16', causing the suction disk 15 and the disk carrier cylinder 14 to move reciprocally between the positioning member 8 and a mold 21. At the position of the positioning member 8, the rod of the disk carrier cylinder 14 descends, attracts the cracker 4 in engagement with the disk 15 by the suction applied thereto from a suction source through a pipe 20, whereupon the rod of the cylinder 14 rises. At the position of the mold 21, the rod of the cylinder 14 descends with the cracker 4 attached thereto, releases the cracker 4 by interrupting the application of the suction through the pipe 20 and thereafter rises.

(4) Mold conveying unit D

The apparatus includes a plurality of molds 21 for three-dimensionally forming the crackers 4. The molds 21 are mounted on an endless chain 24 at a regular spacing and are driven in a circulating fashion with the travel of the endless chain 24. The endless chain 24 is intermittently driven by a motor M by way of a chain 73, a speed reduction gear 25, a Geneva gear 26 and a chain 27.

The mold 21 is shown in detail in FIGS. 4 to 7. The mold 21 comprises a pair of forming plates 210 positioned in parallel to the direction of travel of the mold 21. Each of the forming plates 210 is provided, at the opposite ends of its top 212, with projections 213 for positioning the cracker 4 and has a center cutout 211 in the form of an elongated groove.

Returning now to FIGS. 1 and 2, each cracker 4 is formed by the forming unit E to be described later into a 3-dimensional piece while travelling on the endless chain 24 along the upper path of travel of the chain 24. The cracker is then turned around a right sprocket wheel 23 and is thereafter advanced, as attached to the mold 21, along the lower path of travel of the chain 24. During the travel along the lower path, the cracker 4 is released from the mold 21 by a pusher 57 mounted on an elevator plate 35 and is allowed to fall onto a conveyor 58. The cracker 4 is then conveyed rightward in FIG. 1 and withdrawn through a chute 59. The conveyor 58 is driven by a motor 60 via a belt.

(5) Forming unit E

Figure 3:
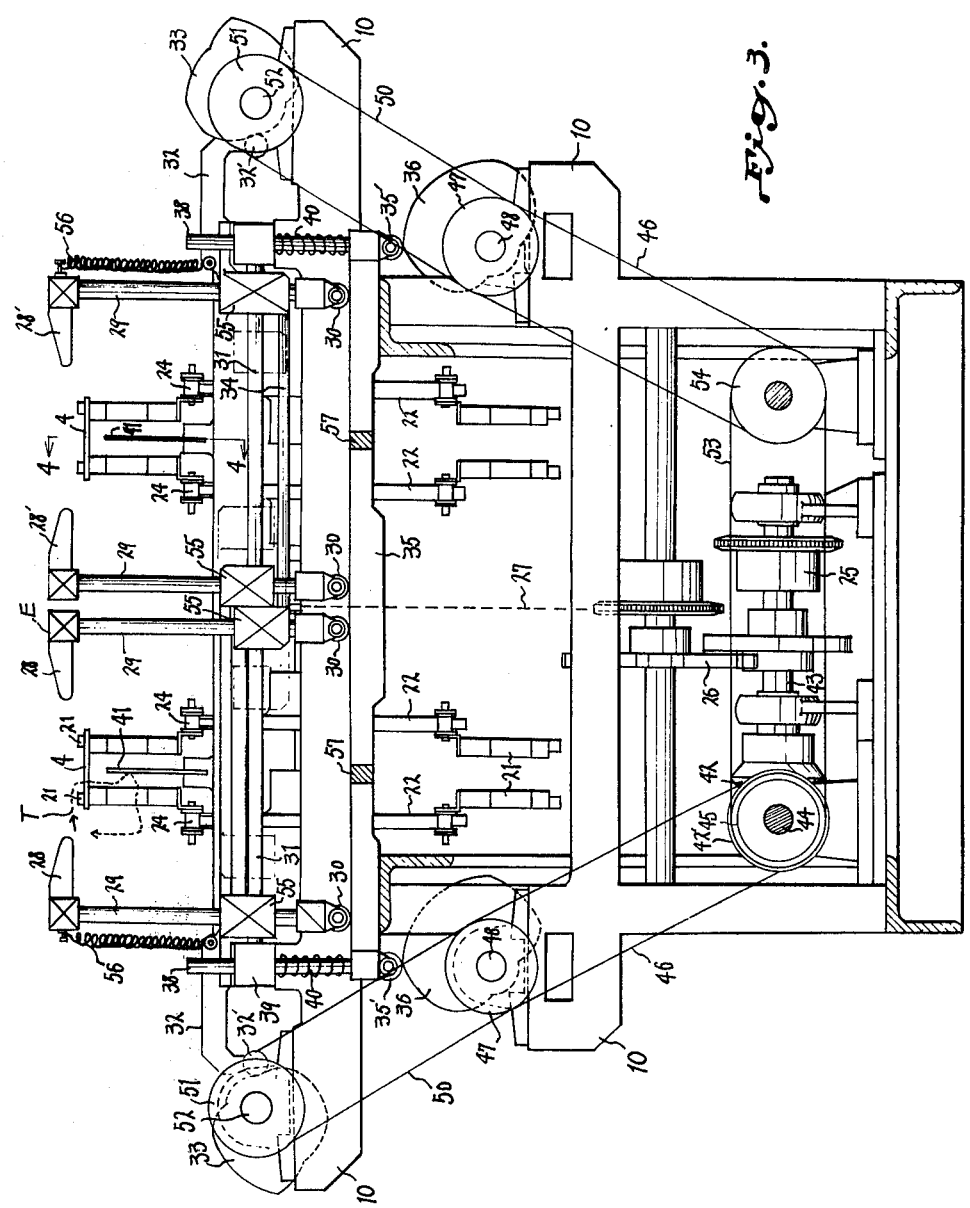
FIG. 3 is a view in section taken along the line 3—3 in FIG. 1.

With reference to FIG. 3, the endless chains 24 are provided in two rows. On the opposite sides of each of the chains 24 where the mold 21 has been advanced by one step from its start position by the intermittent travel of the chain 24, there are a pair of forming claws 28 (28') in opposed relation to each other. The forming claws 28, 28 (or 28', 28') are secured to the upper ends of support rods 29 respectively. The support rods 29 are vertically slidably mounted on sliders 55 respectively. The sliders 55 are horizontally slidably mounted on a horizontal guide bar 31. In order to operatively associate the forming claws 28, 28 (28', 28') provided for each endless chain 24, the sliders 55 of each row are interconnected by a connecting bar 34. Each of the support rods 29 is provided at its lower end with a roller 30 movable on the elevator plate 35.

Cam follower arms 32 for a horizontal motion are secured to the outer support rods 29 respectively. Cam followers 32' turnably mounted on the ends of the cam follower arms 32 are in contact with cams 33 for a horizontal motion rotatably mounted on the opposite sides of the main body 10. Accordingly, the rotation of the cams 33 causes the forming claws 28, 28' and sliders 55 to move on the elevator plate 35 toward or away from the molds 21 respectively. Springs 56 provided between the outer forming claws 28, 28' and the corresponding sliders 55 press the forming claws 28, 28' against the elevator plate 35.

Cam followers 35' for a vertical motion are turnably mounted on the bottom of the elevator plate 35 at the opposite outer ends of the plate and are in contact with cams 36 for a vertical motion which are rotatably mounted on the main body 10. Supporting rods 38 are secured to the upper surface of the elevator plate 35 at the outer ends thereof. The supporting rods 38 are vertically slidable on horizontal guide bar supports 39 secured to the main body 10. The supporting rods 38 are provided with springs 40 which press the elevator plate 35 against the cams 36.

Each of the forming claws 28, 28' is moved along the path T shown in the broken line in FIGS. 3 and 6 by each of the horizontal motion cams 33 and each of the vertical motion cams 36.

With reference to FIGS. 4 to 7, the plate-like cracker 4 is placed between the projections 213 on the top 212 of the mold 21. The forming claws advance over the cracker from the opposite sides thereof inwardly, pushing down the opposite sides of the cracker 4 along the cutouts 211. Accordingly the cracker 4 is folded in two and pushed down with the advance of the claws, bringing the center fold portion into contact with a bulging plate 41. The bulging plate 41 is disposed substantially midway between the two forming plates 210 is parallel thereto, and has an upper edge positioned at a higher level than the lower end of the cutout 211 of each of the forming plates. The forming claws 28 are further depressed, forming a transverse fold in the cracker where it is in contact with the plate 41 and thereby transersely extends the cracker at this portion to form a hollow portion at the center. The forming claws in this position may be retracted, but if the claws are advanced inward and thereafter retracted, the outer peripheries of the portions of the cracker on the opposite sides of the fold can be adhered together more effectively. FIG. 8 shows the cracker 4 thus formed into a three-dimensional piece.

With reference to FIGS. 1 and 3, the powder of the motor M is transmitted from the reduction gear 25 to a rotary shaft 44 by way of a rotary shaft 43, bevel gear 42 and bevel gear 42'. The rotary shaft 44 fixedly carries a sprocket wheel 45 around which a chain 46 is reeved. The chain 46 drives a sprocket wheel 47, which drives one of the vertical motion cams 36. Like the sprocket wheel 47, a sprocket wheel 49 is secured to the shaft 48 and is provided with a chain 50 reeved therearound. The chain 50 drives a sprocket wheel 51 to drive one of the horizontal cams 33. Like the sprocket 45, a sprocket wheel 54 is coupled to the motor M. Accordingly, the other vertical motion cam 36 and horizontal motion cam 33 are similarly driven.

(6) Sequence control unit F

The cracker baking unit A, the cracker transfer unit B, the suction disk transfer unit C, the mold conveying unit D and the forming unit E are under the control of limit switches which control the sequence of the operations of these units.

The embodiment described above operates in the following manner. The crackers 4 baked in the baking plates 1 are scraped off the baking plates 1 by the pivotally movable scraper 3. The released crackers 4 are transferred by the belt conveyor 5 onto the cracker transfer table 6, on which each of the crackers is advanced by the feeding claw 7 to the positioning member 8. At the position of the member 8, the suction disk 15 is lowered by the cylinder 14 for vertically moving the disk. The cracker is sucked by the disk in engagement therewith and thereafter raised by the cylinder 14. The cracker 4 is carried to above the mold 21 by the operation of the cylinder 18 for horizontally moving the disk and placed onto the top 212 of the mold 21 by the action of the cylinder 14, whereupon the cracker is released from the disk 15. The cracker 4 on the top 212 of the mold 21 is intermittently coveyed by the Geneva gear 26, and then is formed into a three-dimensional piece as shown in FIG. 8 by the forming claws 28 which are moved along the path T. The three-dimensionally formed cracker 4 is carried, as attached to the mold 21, by the endless chain 24. During the transport, the cracker 4 is cooled and hardened. While travelling along the lower path of travel of the endless chain 24, the cracker 4 is released from the mold by the pusher 57 movable with the elevator plate 35 and allowed to fall onto the conveyor 58. The cracker is then discharged from the apparatus through a chute 59.

Another embodiment of this invention will be described below, which comprises the foregoing embodiment for forming plate-like crackers into three-dimensional pieces and which further includes means for enclosing a fortune-telling, divinatory or like printed article in the interior hollow portion of each of the crackers 4.

With reference to FIG. 1, the main body 10 is provided above the cracker transfer table 6 with a label hopper 61 containing divinatory or like printed articles 62. A label enclosing cylinder 69 is secured to a supporter 71. The label enclosing cylinder supporter 71 is pivotably connected to one end of each of link bars 67, 68 having different lengths. The other end of each of the link bars 67, 68 is pivoted to a link bar support 66. A label transfer cylinder 63 is pivoted at its base portion to the link bar support 66. The label transfer cylinder 63 has a rod 64 pivotably connected to substantially the midportion of the link bar 68. A suction disk 70 attached to the end of the rod of the enclosing cylinder 69 is in communication with a suction source via a pipe 72.

By the retraction of the label transfer cylinder rod 64 caused by the operation of the label transfer cylinder 63, the label enclosing cylinder 69 is brought to a position below the label hopper 61 with the suction disk 70 facing upward along with the cylinder supporter 71. At this position, the label enclosing cylinder 69 is operated, raising the suction disk 70 until the disk 70 comes into contact with the lowermost printed article 62 in the label hopper 61, whereupon the suction disk attracts the printed article 62 in engagement therewith. The label enclosing cylinder 69 is operated again, lowering the suction disk 70 with the printed article 62 attached thereto. The label transfer cylinder 63 then operates, stretching the rod 64, whereby the label enclosing cylinder 69 is brought to a position above the mold 21 with the suction disk 70 facing downward, along with the supporter 71. The label enclosing cylinder 69 then operates to press the printed article 62 against the cracker on the mold 21 before the forming operation. The position of the mold 21 where the printed article 62 is pressed onto the cracker is the same as the position where the forming claws of the forming unit E are actuated into operation.

When the suction disk 70 presses the printed article 62 against the cracker 4, the forming claws 28 on the opposite sides thereof advance inward and push down the cracker. The printed article 62 is folded in two along with the cracker 4 by the forming claw 28 and depressed. At this time the disk 70 releases the printed article 62 and rises. Subsequently, the forming claws operate in the manner already described to form the cracker 4 into a three-dimensional piece with the printed article 62 enclosed therein.

I claim:
1. An apparatus for producing three-dimensionally formed crackers comprising:
   two parallel forming plates spaced apart by a predetermined distance, each of the forming plates having at its upper end a top portion for placing a cracker thereon, projections formed at the opposite ends of the top portion for positioning the cracker and a cutout extending downward from substantially the midportion of the top portion;
   a bulging plate substantially midway between the two forming plates, parallel thereto and having an upper edge positioned at a higher level than the lower end of the cutout of each of the forming plates;
   two forming claws on the opposite outer sides of said forming plates and at right angles to the forming plates; and claw moving means for moving each of the forming claws along a path extending toward and over the top portion of the forming plate immediately adjacent thereto, then for moving said claws further downward along the cutout of the forming plate past the upper edge of the bulging plate, then moving the forming claws further toward each other, and thereafter, extending the forming claws away from the forming plates said claw moving means being comprised of:

two vertical motion cams in the form of plate cams disposed on left and right sides of the apparatus and each having a curved cam periphery;

an elevator plate mounted on the main body of the apparatus and vertically movable by the vertical motion cams;

two horizontal motion cams in the form of plate cams disposed on the left and right sides of the apparatus and each having a curved cam periphery, the horizontal motion cams being operative by the same power source as the vertical motion cams in timed relation thereto;

a horizontal guide bar secured to the main body of the apparatus;

two sliders slidably mounted on the horizontal guide bar and movable by the horizontal motion cams; and two support rods placed on the elevator plate on the opposite sides of the apparatus and spring-loaded against the elevator plate at all times, the support rods being mounted on the sliders and vertically movable with the elevator plate, the support rods having the forming claws secured to their upper ends respectively.

2. An apparatus as claimed in claim 1, further comprising:

a cracker baking unit including openable and closable baking plates mounted on an endless chain for continuously baking plate-like crackers;

a cracker transfer unit for transferring the plate-like crackers baked by the baking unit;

a suction disk transfer unit having a suction disk for sucking each of the plate-like crackers transferred by the transfer unit and transferring the cracker onto the top of the forming plates;

a forming plate conveying unit for intermittently conveying the forming plates and the bulging plate and releasing the crackers from the forming plates during the transport after the cracker has been formed into a three-dimensional piece by the forming claw driving means; and a sequence control unit including electrically operative means for controlling the sequence of the operations of the units.

3. An apparatus as claimed in claim 1, further comprising a printed article transfer unit for transferring a printed article onto a substantially central portion of the cracker on the forming plates.

4. An apparatus as defined in claim 3 wherein the printed article transfer unit sucks the printed article and transfers the printed article onto the cracker on the top of the forming plates before the cracker is three-dimensionally formed.

* * * * *